United States Patent [19]

Keller

[11] Patent Number: 4,835,546
[45] Date of Patent: May 30, 1989

[54] ELECTRONIC DATA RECORDER APPARATUS AND METHOD

[76] Inventor: Walter L. Keller, 3901 Gordon Dr., Naples, Fla. 33940

[21] Appl. No.: 68,436

[22] Filed: Jul. 1, 1987

[51] Int. Cl.$^4$ .............................................. G01D 9/00
[52] U.S. Cl. ................................... 346/33 D; 346/18; 346/59; 346/79; 346/97
[58] Field of Search .................... 346/33 D, 33 R, 50, 346/59, 60, 79, 97, 18

[56] References Cited

U.S. PATENT DOCUMENTS

| | | | |
|---|---|---|---|
| 1,471,850 | 10/1923 | Kimes et al. | 346/60 |
| 1,690,827 | 11/1928 | Matthiessen et al. | 346/60 |
| 1,958,565 | 5/1934 | Coil | 101/66 |
| 2,159,727 | 5/1939 | Markley, Jr. | 234/2 |
| 2,254,661 | 9/1941 | Markley et al. | 161/1 |
| 2,392,467 | 1/1946 | Engel et al. | 234/36.5 |
| 3,099,817 | 7/1963 | Kendall | 346/33 D |
| 3,188,647 | 6/1965 | Davis | 346/60 |
| 3,453,650 | 7/1969 | Shuichi | 346/79 |
| 3,754,122 | 8/1973 | Dinapoli et al. | 235/92 DN |
| 4,083,052 | 4/1978 | Metcalf | 346/18 |
| 4,395,624 | 7/1983 | Wartski | 346/33 D |
| 4,547,781 | 10/1985 | Gelhorn | 346/33 R |

Primary Examiner—C. L. Albritton
Assistant Examiner—Mark Reinhart
Attorney, Agent, or Firm—Willian Brinks Olds Hofer Gilson & Lione Ltd.

[57] ABSTRACT

An improved electronic data recorder for use in a vehicle includes a housing having a pair of connectors. The housing encloses a modular converter, a printer module, a continuous roll of paper, a modular paper advance mechanism, conversion electronics, and memory and computation electronics. Also included in the housing are a driver code input keypad, a clock and date display, and keys for selecting a variety of functions. The data recorder connects to a free end of a rotatable odometer-speedometer cable between a rotating part of a vehicle to which the cable is attached and the vehicle odometer-speedometer. The data recorder also connects to the vehicle battery and ignition switch. The rotational motion of the cable is communicated into the housing of the data recorder by one of the connectors and from there into the modular converter. The converter converts the rotational motion into a plurality of unique electrical signals representative of mileage. The printer module and modular paper advance mechanism are responsive to the activation and deactivation of the vehicle's ignition switch to print the driver code, date, current odometer reading, and elapsed mileage.

4 Claims, 5 Drawing Sheets

FIG_7_

FIG_8_

FIG_9_

ELECTRONIC DATA RECORDER APPARATUS AND METHOD

BACKGROUND OF THE INVENTION

The invention disclosed herein relates generally to the field of data recorders for use in automobiles, trucks, and other road vehicles. In particular the present invention contemplates an improved automatic electronic data recorder for use in vehicles having a standard odometer-speedometer system which includes a rotatable cable attached to a portion of the vehicle, such as a wheel or transmission, which rotates with vehicle movement.

For various reasons, it has been found necessary or desirable to record certain data relating to the use of road vehicles over the years. For example, taxing authorities in various places and at various times have required records detailing the usage of certain vehicles. Also, employers have desired to keep track of the uses to which their employees put company owned vehicles, and to have an indication of job performance as well. Recently, the Internal Revenue Service has required owners of vehicles used partially for business and partially for personal use to submit detailed records of the usage of these vehicles in order to support business deductions for the cost of operating them. In these and other instances, it has been found advantageous to record such data as time and date, total and elapsed mileage, driver, type of use, origin and destination, and the like.

In the past, a variety of mechanical and electromechanical data recorders have been proposed to record various subsets of the above-identified data items. These prior art data recorders commonly contain a very large number of intricate moving parts interconnected in a complex mechanical arrangement. As a result, the data recorders disclosed by the prior art are expensive to manufacture and difficult to adjust and repair. In addition, replacement parts generally must be manufactured specially and to exact specifications for the specific data recorder being used.

The present invention contemplates an improved automatic electronic vehicular data recorder which eliminates these drawbacks of the prior art data recorders. The vehicular data recorder of the present invention has many fewer moving parts than the prior art data recorders, is generally modular in construction, and can be inexpensively and easily manufactured and repaired, largely using standard off-the-shelf components. At the same time, the present invention contemplates a vehicular data recorder that is largely automatic in operation and which provides a permanent record of date, mileage, driver, and vehicle usage.

SUMMARY OF THE INVENTION

The above objects and attendant advantages of the present invention are achieved by providing an improved automatic electronic data recorder having a housing connectable to a rotatable speedometer-odometer cable between a rotating part of a vehicle to which the cable is attached, and a speedometer-odometer.

The housing has a connector which is adapted to releasably couple an end of the speedometer-odometer cable to transmit the rotational motion of the speedometer-odometer cable into the housing.

A modular converter in the housing is coupled to the first connector and converts the rotational motion of the speedometer-odometer cable into electrical signals representative of mileage.

The converter has a number of parallel rotatable inner drums connected together in a geared odometer arrangement for rotating with the rotational motion of the speedometer-odometer cable.

A corresponding number of fixed parallel outer drums surround the inner drums. Each outer drum has a number of electrically conductive sections arranged in pairs. Each individual conductive section is electrically isolated from every other individual conductive section. Each pair of conductive sections represents a mileage digit.

Each inner drum has an electrically conductive contact element which contacts the corresponding outer drum, and which sequentially electrically connects the individual conductive elements of each conductive pair of the corresponding outer drum as the inner drum rotates.

The novel features which are believed to be characteristic of the present invention are set forth in the appended claims. A presently preferred embodiment of the invention itself, together with further objects and attendant advantages will be best understood by reference to the accompanying drawings taken in connection with the following detailed description.

BRIEF DESCRIPTION OF THE DRAWINGS

An exemplary illustration of an electronic vehicular data recorder comprising a presently preferred embodiment of the present invention is shown in the accompanying drawings, in which.

DETAILED DESCRIPTION OF A PRESENTLY PREFERRED EMBODIMENT

Figure 1:
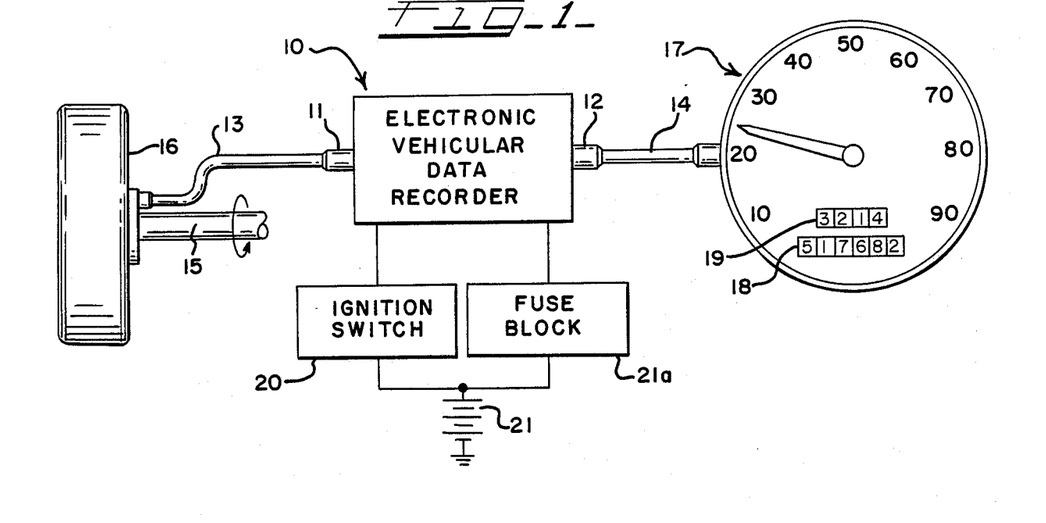
FIG. 1 is a block diagram showing the electronic vehicular data recorder installed in a vehicle.

With reference to the drawings, there is shown in FIG. 1, an electronic vehicular data recorder (hereinafter "data recorder") 10 embodying the present invention installed in a vehicle having a standard mechanical speedometer-odometer system. As used herein, "vehicle" refers to any machine or device, portions of which rotate with movement thereof, whether or not motorized, and whether or not such machine or device is intended for road use. The standard speedometer-odometer system comprises a flexible rotatable cable 13 connected at one end to a wheel 16 of the vehicle. The wheel 16 in turn is connected to an axle 15. Alternatively, the speedometer-odometer cable 13 could be connected to other rotating portions of the vehicle such as the transmission. In the driver compartment of the vehicle is a standard mechanical speedometer-odometer 17 which may include both a total mileage odometer 18 and a trip odometer 19.

Normally, the end of the flexible rotatable cable 13 opposite the wheel 16 would be connected directly to the speedometer-odometer 17. However, when the data recorder 10 embodying the present invention is installed, flexible rotatable cable 13 is coupled to it via a first connector 11. An extension cable 14 which is also flexible and rotatable is provided and is coupled to the data recorder 10 at one end through a second connector 12 and to the speedometer-odometer 17 at its opposite end.

The data recorder 10 is also electrically connected to the vehicle battery 21 through the vehicle's ignition switch 20 and fuse block 21a. The battery 21 supplies electrical power to the various electronic components of the data recorder 10 which will be discussed in detail below.

Figure 2:
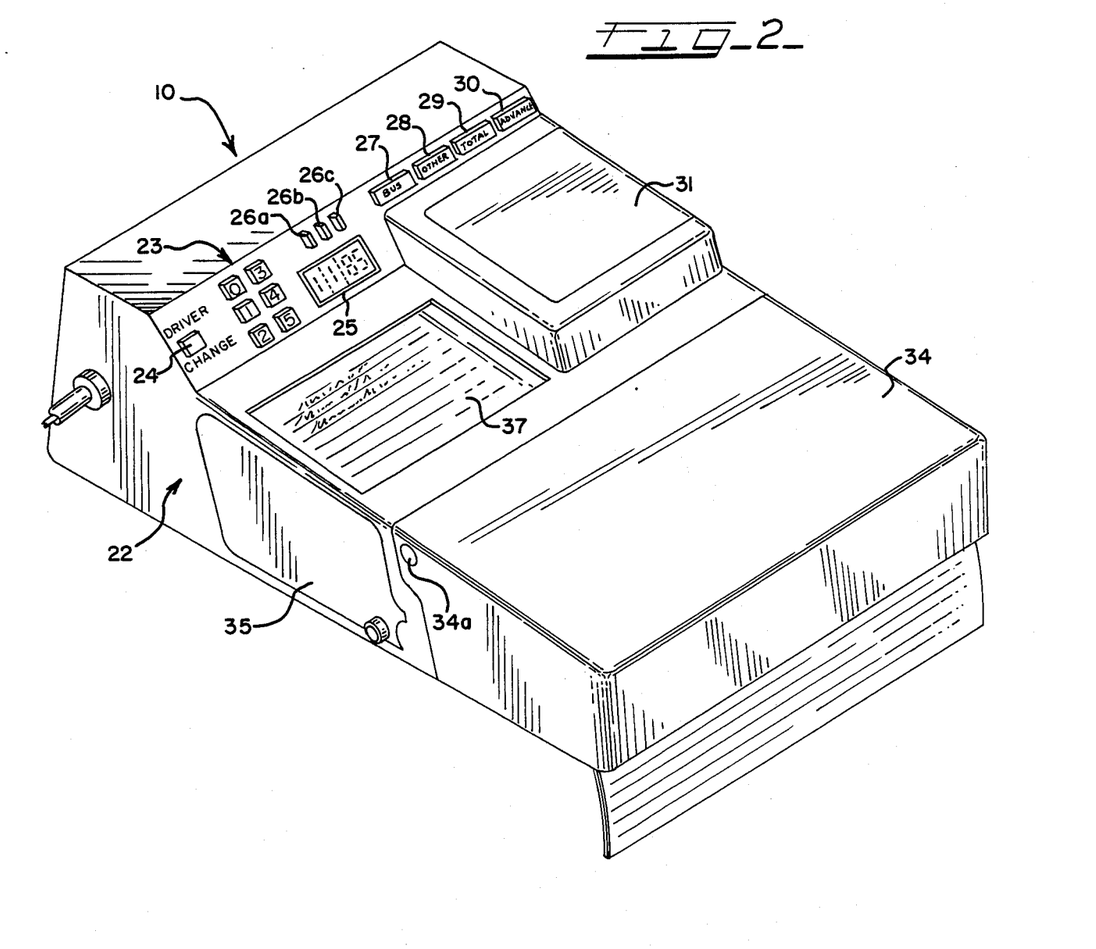
FIG. 2 is an elevational view of the electronic vehicular data recorder with all access covers and modular elements in place.

As illustrated in FIG. 2, the data recorder 10 has a protective housing 22 which is preferably constructed of a strong but light-weight material such as aluminum. The housing 22 is preferably located in the driver's compartment of the vehicle on the transmission hump between the driver and front passenger seats to facilitate access but may, if desired, also be located elsewhere in the vehicle between the wheel 16 and odometer-speedometer 17.

Mounted on the outside of the housing 22 is a driver code input keypad 23 and a driver change control key 24. The driver code input keypad 23 and driver change control key 24 preferably comprise a conventional data entry keypad and accompanying processing circuitry well known to those skilled in the art.

Also mounted on the outside of the housing 22 is a date display 25 and a group of three setting buttons 26a, 26b, 26c. The date display 25 continuously displays continuously the day, month, and year, and is automatically updated continuously by an electronic clock 110 mounted inside the housing 22. The date display 25 and clock 110 preferably comprise a conventional digital clock and read-out of the type commonly used in digital watches and desk-top clocks and calendars. As is common in such watches, clocks, and calendars, setting buttons 26a, 26b, and 26c are used to manually set or reset the displayed day, month, and year respectively.

In addition, a business select button 27 and an "other" select button 28 are mounted on the outside of the housing 22. These buttons allow the operator of the vehicle to input whether a particular use of the vehicle is for business or another purpose. The business and "other" select buttons 27, 28 preferably comprise standard pushbutton switches, such as momentary action switches, for example. The functions initiated by these buttons will be discussed with the operation of the data recorder 10 below.

Also, mounted on the outside of the housing 22 are a total button 29 and an advance button 30, both of which also preferably comprise standard pushbutton switches. For reasons which will become apparent with the discussion of operation below, it is preferred that the total button 29 be backlit when the data recorder 10 is in operation until it is actuated. The functions initiated by the total and advance buttons 29, 30 will also be discussed with the operation of the data recorder below.

Figure 3:
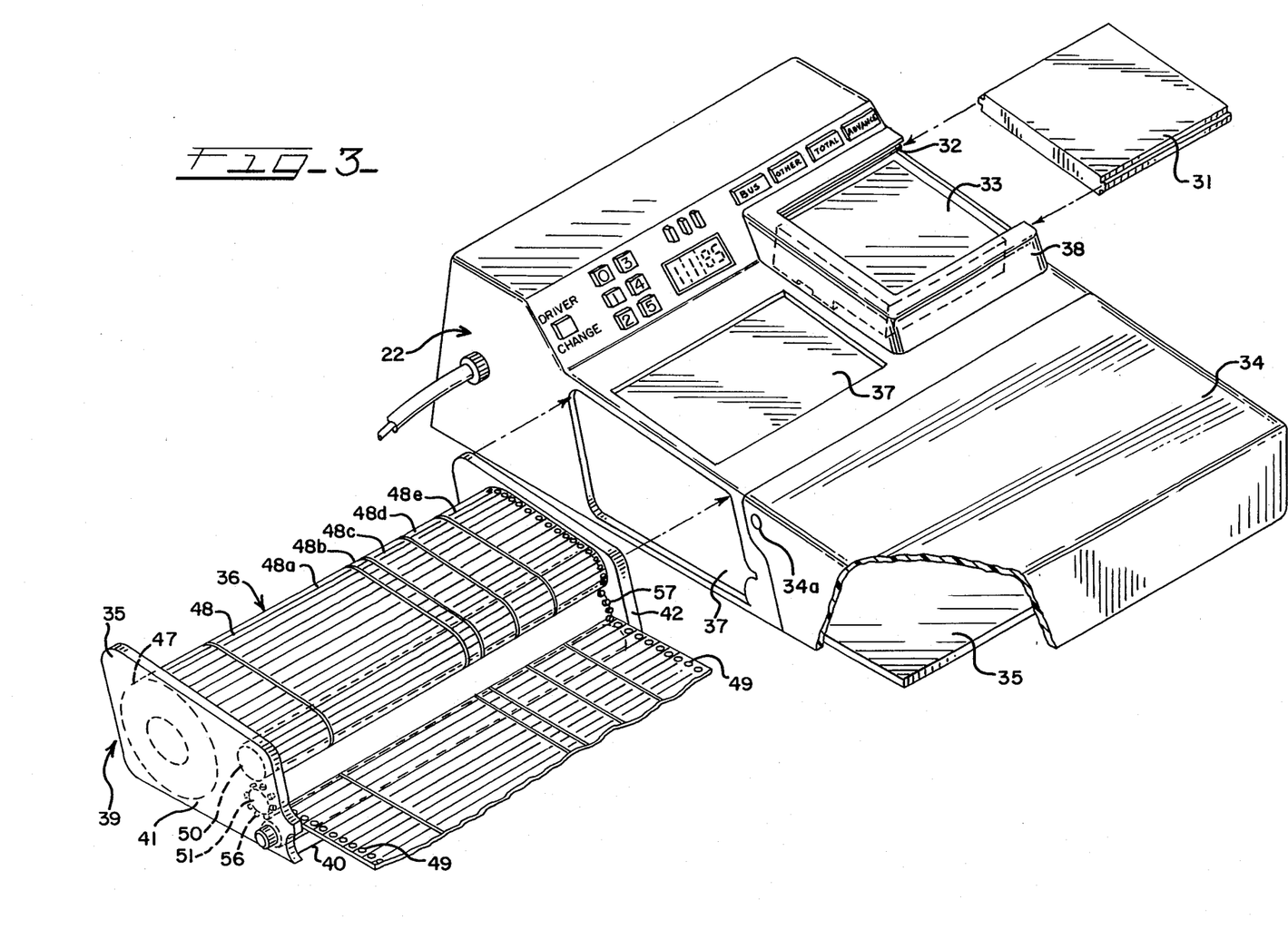
FIG. 3 is an exploded elevational view of the electronic vehicular data recorder with access covers and modular elements removed.

FIGS. 2 and 3 illustrate the housing 22 with all modules and access covers in place and with all modules and access covers removed respectively. It is preferred that the housing 22, with all access covers and modules in place, be a substantially closed unit in order to discourage tampering therewith. A first access cover 31 slides into a slotted opening 32 in an upraised portion 38 of the housing 22 to form a substantially flush and contiguous top surface. A second access cover 34 pivots on a pin or hinge 34a. In its closed position, it fits flush with the top and sides of the housing 22 to provide substantially contiguous top and side surfaces. One side 35 of a paper drive and storage mechanism 36 also fits flush with a corresponding opening 37 in the housing 22 to provide a substantially flush and contiguous side surface.

With all access covers removed or opened, and all modules removed, it is seen that the paper drive and storage mechanism 36 is of a type familiar to those skilled in the art. It consists of a frame 39 having a bottom surface 40 and two parallel upstanding side surfaces 41, 42. The entire frame 39 slides into the body of housing 22 with the bottom surface 40 being in contact with the bottom surface of the housing 22. A pair of corresponding holes (not shown) formed in any conventional manner in the side surfaces 41, 42 of the frame 39 accept a pair of corresponding fixed pins (not shown) located at opposite ends of a tubular paper storage roll 47. The relative dimensions of the holes and fixed pins are such that the pins and hence the paper storage roll 47 rotate freely about a substantially horizontal axis. A continuous paper form 48 for recording vehicular usage data is wound about the paper storage roll 47. The paper form 48 is preferably pre-lined to record various data items in individual columns and to provide adequate space for additional comments by the operator of the vehicle. In addition, the paper form 48 preferably has perforated sheets to facilitate detachment of completed sections of the form. Also, it is preferred that the paper form 48 have pre-cut openings 49 near its edges to accept the pins of a paper advance mechanism such as a tractor feed. A guide roll 50 and drive roll 51 are also mounted to the upstanding side surfaces 41, 42 of the frame 39 in the same manner as the paper storage roll 47 so that each is freely rotatable in a substantially horizontal plane. It is preferred that the guide roll 50 be mounted immediately above and in very close proximity to the underlying drive roll 51. At opposite ends of the drive roll 51, are two sets of tractor pins 56, 57 which extend radially upward around the periphery of the roll. Guide roll 50 can contain a pair of slots (not shown) in corresponding locations nears its opposite ends to provide clearance for the tractor pins 56, 57, if necessary. The paper form 48 is fed between the guide roll 50 and drive roll 51. The tractor pins 56, 57 on the drive roll 51 engage the pre-cut openings 49 of the paper form 48 while the proximity of the guide roll 50 and drive roll 51 prevents disengagement of the paper form 48 therefrom.

Figure 4:
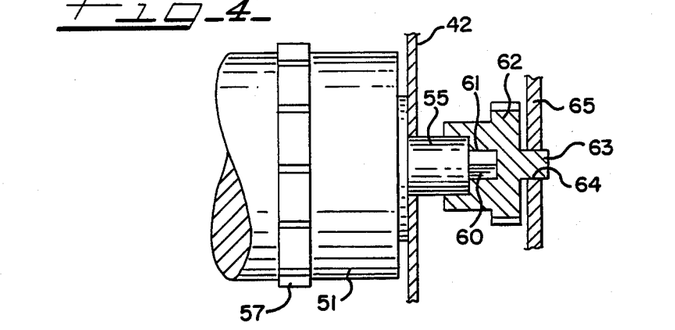
FIG. 4 is an enlarged fragmentary plan view of an arrangement for coupling the drive roller shown in FIG. 3 to an advance mechanism.

Referring to FIG. 4, it is seen that one of the fixed mounting pins 55 connected to the drive roll 51 extends through the corresponding opening in one of the upstanding side surfaces 42 of the frame 39. The end of mounting pin 55 is a rigid tab 60. The tab 60 fits into a mounting slot 61 on an advance gear 62. On the opposite side of the advance gear 62 is a fixed mounting pin 63 which in turn fits into a pre-formed opening 64 in a side wall of the housing 22 or in a separate upstanding wall 65 connected to the inside surface of housing 22. The advance gear 62 is free to rotate and is connected with drive roll 51 via the tab 60 and mounting slot 61 so that as it rotates, the drive roll 51 correspondingly rotates.

The advance gear 62, in a presently preferred embodiment of the invention, forms part of a standard paper advance mechanism (not shown) of the type well known to those skilled in the art and commonly used in modern electric typewriters such as the typewriter manufactured and sold by International Business Machines under the IBM Selectric trademark. This type of paper advance mechanism is commonly an electromechanical device which may have a solenoid for controlling the position of linkage connected to the advance gear 62 so that when a push button switch is closed, for example, the advance gear 62, and hence the drive roll 51, are caused to rotate by a preselected amount. Alternatively, as will be recognized by those stilled in the art, an electric step motor of the type commonly employed in drive roll 51 directly in predetermined increments.

Referring once again to FIGS. 2 and 3, the first access cover 31 covers a conventional printer module 33 preferably of the type commonly found in inexpensive printing calculators such as those manufactured by Canon and other companies. The printer module 33 is seated in the upraised portion 38 of the housing 22 above paper form 48 and contains a standard dot matrix print-head, ink ribbon, and print-head drive mechanism (not shown), the construction and operation of which are familiar to those skilled in the art. The printer module 33 may also contain a standard printer driver circuit for converting data signals into control codes to cause the print-head pins to fire. Alternatively, the printer driver circuit may be contained on a board or chip external to the printer module 33. Preferably, the dot-matrix print-head of the printer module 33 has sufficient lateral range to print data in at least columns 48b–48e of paper form 48.

Also preferably, an opening 37 in the top of the housing 22 provides access to column 48a of the paper form 48 so that the operator of the vehicle can record information such as origin and destination in addition to the data automatically recorded by the data recorder 10. The second access cover 34 in its closed position provides an arm rest for the operator and facilitates the recording of written information in column 48a.

The second access cover 34, pivoted into its open position, exposes a hollow paper discharge area 35 in housing 22 into which the paper form 48 is fed by the drive roll 51 after vehicle usage data has been recorded thereon by the printer module 33 and the vehicle operator. It is preferred that an opening be present between the front edge of the bottom of the housing 22 in the discharge area 35 and the front edge of the second access cover 34. The paper form 48 is preferably fed through this opening and out of the housing 22 so as not to interfere with the operation of the drive roll 51 or printer module 33. The completed paper form 48 is preferably removed from the data recorder 10 by tearing along a perforation.

Figure 5:
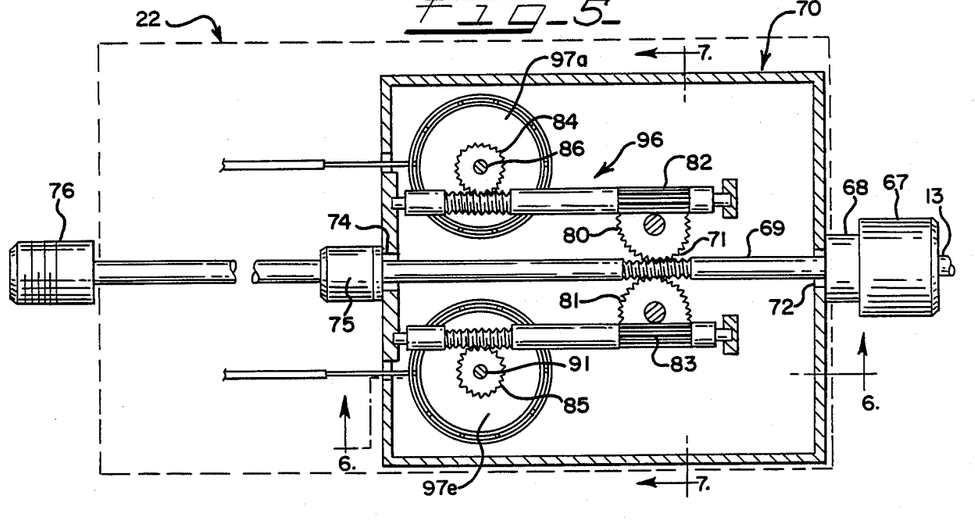
FIG. 5 is a plan view of a converter for converting the rotational motion of a speedometer-odometer cable into electrical signals.
Figure 6:
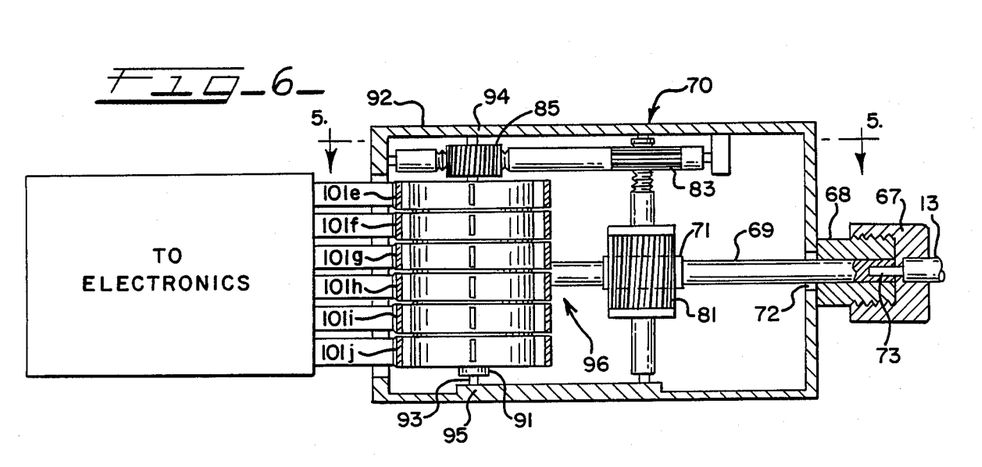
FIG. 6 is a cross-sectional view of the converter of FIG. 5 taken along the line 6—6.
Figure 7:
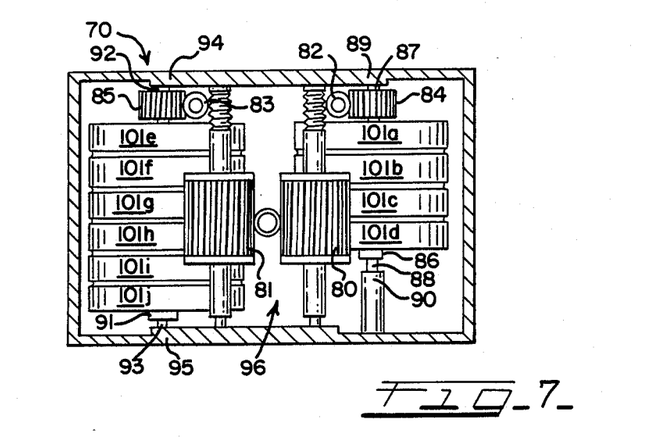
FIG. 7 is a cross-sectional view of the converter of FIG. 5 taken along the line 7—7.

The physical connection between the housing 22 and the speedometer-odometer cable 13 is made using the standard apparatus used to connect the speedometer-odometer cable 13 directly to the vehicle's speedometer-odometer 17. As best illustrated in FIGS. 5–7, the end of the standard speedometer-odometer cable 13 has, or is easily fitted with, a hollow, cylindrical, internally threaded housing 67. A hollow, cylindrical male connector 68 having corresponding external threads is connected to one side of a converter housing 70 in any suitable manner. An opening (not shown) large enough to accommodate the male connector 68 is formed in any suitable manner in the side of the data recorder housing 22 where the free end of the speedometer-odometer cable 13 is to be connected. The converter housing 70 is fixedly mounted in the data recorder housing 22 in any suitable manner with the male connector 68 protruding through the opening, and the threaded housing 67 is threaded onto the male connector 68.

As illustrated in FIG. 6, the speedometer-odometer cable 13 extends into the threaded housing 67. Likewise, a rigid rod 69 extends through an opening 72 in the wall of the converter housing 70 and into the male connector 68. The rigid rod 69 is not fixed but is free to rotate, preferably about a substantially horizontal axis. A receptor area 73 having a geometry corresponding to the end of the speedometer-odometer cable 13 is hollowed out of the end of the rigid rod 69 to receive the end of the speedometer-odometer cable 13 when the threaded housing 67 and male connector 68 are connected. A fixed mechanical contact between the speedometer-odometer cable 13 and the rigid rod 69 results so that the rigid rod 69 rotates in unison with the speedometer-odometer cable 13 and communicates this rotational motion into the data recorder housing 22 and into the converter housing 70.

The connection between housing 22 and the speedometer-odometer 17 is likewise made using the standard apparatus used to connect the speedometer-odometer cable 13 to the speedometer-odometer 17. As illustrated in FIG. 5, the rigid rod 69 extends the length of the converter housing 70 and protrudes through an opening 74 in the wall thereof. A hollow cylindrical connector guide 75 is fixedly mounted to the external surface of the wall of the converter housing 70 in any suitable manner and the rigid rod 69 also extends through it. Preferably, the connector guide 75 does not rotate but allows the rigid rod 69 to rotate freely while minimizing any lateral movement thereof. This is satisfactorily accomplished in a conventional manner by locating a concentric circular track containing ball bearings inside the connector guide 75, for example. The rigid rod 69 continues the length of the data recorder housing 22. The side wall of the housing 22 opposite where the speedometer-odometer cable connection is made contains an opening of sufficient diameter to accommodate the rigid rod 69. A second threaded male connector 76 identical to the first is fixedly attached in any suitable manner to the external surface of the wall over the opening. The rigid rod 69 extends through the opening and into the second male connector 76. The end of the rigid rod 69 contains a second hollow receptor area (not shown) identical to the first. An extension cable 14 having at its free end a second threaded housing (not shown) identical to the first extends from the speedometer-odometer 17. The second threaded housing is threaded over the second male connector 76, and the end of the rigid cable 69 and the extension cable 14 come into fixed mechanical contact as previously described. As a result, the extension cable 14 rotates in unison with the rigid rod 69 so that the rotational motion of the rigid rod 69 is communicated to the speedometer-odometer 17.

An electro-mechanical converter 96 converts the rotational motion of the speedometer-odometer cable 13 into electrical signals which represent vehicle mileage. The converter 96 is mounted in converter housing 70. In a presently preferred embodiment of the present invention the converter 96 comprises a modified conventional drum odometer having trip and total mileage indicators.

The conventional odometer portion of the converter 96 will first be described with reference to FIGS. 5–7. As shown, a spiral gear 71 is formed integrally with the horizontal rigid rod 69. The spiral gear 71 meshes with first and second vertical gears 80, 81 which are disposed on opposite sides of the spiral gear 71 in the converter housing 70 in conventional fashion. The first and second vertical gears 80, 81 in turn mesh with gears 82, 83 respectively, which in turn mesh with gears 84, 85 respectively. Gears 84 and 85 are fixedly connected in conventional fashion to parallel first and second shafts 86, 81 respectively. Parallel first and second shafts 86, 81 are each supported for rotation in converter housing 70 via pins 87, 8 and pins 92, 93 respectively extending from opposite ends thereof into supporting notches 89, 90 and 94, 95 respectively in the internal walls of the housing 70. In this conventional arrangement, the rotational motion of the vehicle speedometer-odometer cable 13 is reduced and transmitted equally to the first and second parallel shafts 86, 91.

The modification which transforms the conventional odometer into converter 96 relates to the drums, and will now be described. In a conventional drum odometer, the first and second parallel shafts 86, 91 would respectively have fixedly attached thereto a first and second set of parallel odometer drums. The set of drums on shaft 86, for example, would indicate trip mileage, while the set of drums on shaft 91 would indicate total vehicle mileage. Each drum would have the digits 0–9 equidistantly spaced on its outer surface for this purpose. The parallel odometer drums on each shaft would be connected in a geared arrangement well known to those skilled in the art so that the drum furthest to the right on the shaft represents tenths of miles, the next drum to the left turns only upon compleion of a revolution of the first drum to represent miles, and so on. Exemplary of the typical odometer described above is the odometer assembly found in many Fiat automobiles sold in the U.S. during the 1970's.

In a presently preferred embodiment of the present invention, each conventional odometer drum is replaced by a drum structure having the novel and unique construction now described. As shown best in FIGS. 5–8, each conventional odometer drum comprising part of the trip odometer and connected to the first parallel shaft 86 is replaced by an inner drum 97a–d (only 97a shown). Likewise, each conventional drum comprising part of the total mileage odometer and connected to second parallel shaft 91 is replaced by an inner drum 97e–j (only 97e shown). The inner drums 97a–d and 97e–j are connected to the first and second parallel shafts 86, 91 respectively and to each other in the conventional geared odometer arrangement described above. Each inner drum 97a–j is constructed in any suitable manner of an electrically non-conductive material. For example, the inner drums 97a–j can be molded of a non-conductive plastic. A corresponding concentric outer drum 101a–j surrounds each inner drum 97a–j.

Figure 8:
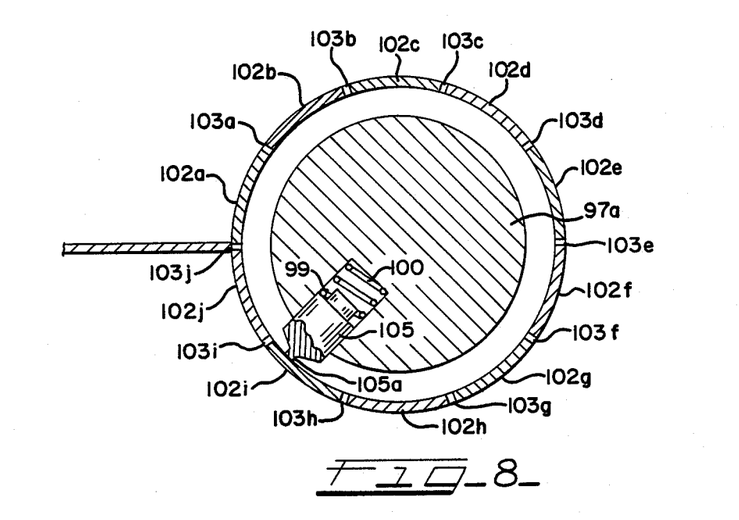
FIG. 8 is an enlarged plan view of an inner drum and outer drum of the converter of FIG. 4.

Each outer drum 101a–j is mounted in any suitable manner in a fixed position to the interior of the converter housing 70 and does not rotate. Mounting hardware preferably holds the outer drums 101a–j firmly in place, are electrically non-conductive, and do not interfere with the rotation of the inner drums 97a–j.

Figure 9:
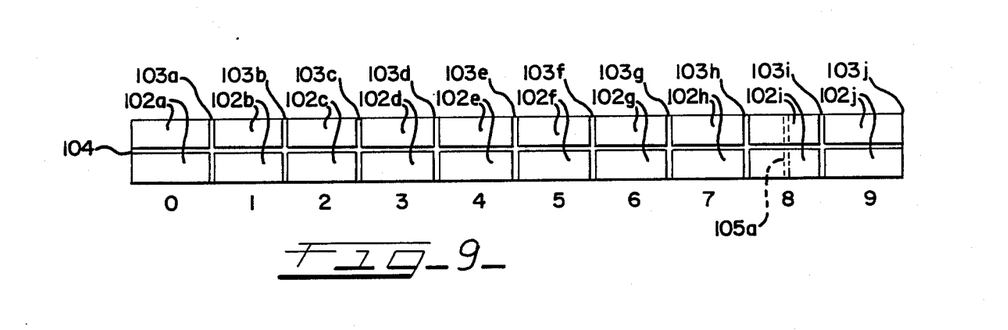
FIG. 9 is an expanded flat plane view of the outer drum of FIG. 7.

As illustrated in FIG. 9, the surface of each outer drum 101a–j contains 20 symmetrically arranged pairs of electrically conductive material 102a–j. Each 105 sequential pair, for example pair 102a, is electrically isolated from every other pair, for example pair 102b, by transverse gaps of electrically non-conductive material 103a–j. Each individual section of each electrically conductive pair is likewise isolated from the other individual section of the pair by a longitudinal gap of non-conductive material 104. Each sequential pair 102a–j represents an odometer drum digit 0–9 respectively. The outer drums 101a–j are preferably molded of a non-conductive material such as the epoxy fiber or plastic material commonly used to construct printed circuit boards. The pairs of electrically conductive material 102a–j on each drum 101a–j are preferably deposited using a conventional photoresist mask technique such as is used to construct printed circuits or other comparable techniques.

Each inner drum 97a–j has a well 99 formed in its outer face. A bias spring 100 is seated in the well 99. An electrically conductive contact element 105 having a tip 105a is positioned in the well 99 atop the bias spring 100 between the outer face of the inner drum 97a–j and the inner face of the outer drum 101a–j so that the tip 105a is biased into contact with the inner face of outer drum 101a–j. The tip 105a is preferably a narrow, elongate structure which contacts outer drum 101a–j transversely to the longitudinal gap of electrically non-conductive material 104. The tip 105a is sufficiently wide to bridge the gap 104 and sequentially bring the individual conductive sections of each pair into electrically conductive contact as the inner drum 97a–j rotates. It is preferable to minimize the area of contact between the tip 105a and the inner face of the outer drum 101a–j so that solid electrical contact is established and maintained with a minimum of bias force.

Figure 10:
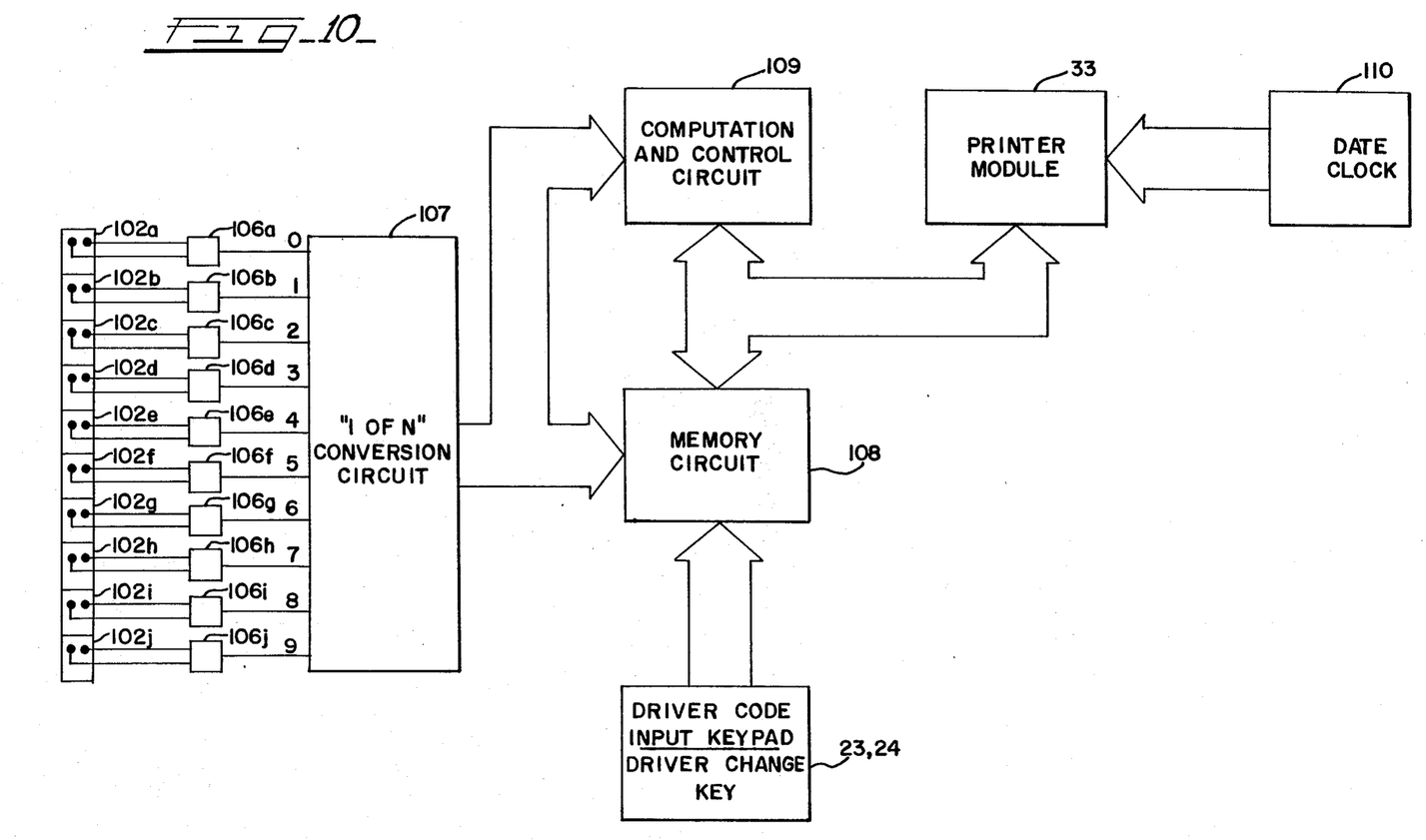
FIG. 10 is a block diagram showing the functional interconnections of the electronic components for processing, storing and recording the vehicular usage data.

Referring to FIG. 10, each pair of sections of electrically conductive material 102a–j is electrically connected in a conventional manner to a circuit 106a–j of a type familiar to those skilled in the art which produces a signal when the tip 105a electrically connects the individual sections of the pair. Such a circuit may consist, for example, of an inverter with its input line held high when the sections of a conductive pair are not electrically connected, and pulled low when they are connected. The output signals from the circuits 106a–j are routed in parallel to a conventional "1 of N" conversion circuit 107 which also is familiar to those skilled in the art. The "1 of N" conversion circuit 107 converts the input signals to a standard format such as binary coded decimal (BCD) to facilitate storage and printing. Although only a single "1 of N" conversion circuit 107 and set of pulse producing circuits 106a–j is described, it should be apparent that an identical arrangement exists for each drum 101a–j. The data signals generated by each "1of N" conversion circuit 107 are routed to a memory circuit 108 and to a computation and control circuit 109 in a well known manner. The memory and computation and control circuits 108, 109 are interconnected in a conventional manner to provide bidirectional data flow between them. The memory circuit 108 also receives input data from the driver code input keypad 23 for storage. Both the memory circuit 108 and the computation and control circuit output data to the printer module 33 for printing. In addition, the printer module 33 also receives data for printing from the clock 110. The memory and computation and control circuits 108, 109 are preferably conventional circuits of the type commonly used in inexpensive calculators manufactured by Canon and other companies. In order to conserve space, and to facilitate manufacture, repair, and the like, the above-described components, except the printer module 33, are preferably assembled on a single circuit board (not shown), Which is mounted in the housing 22 directly behind the area containing the driver code input keypad 23, the date display 25 and the business "other," total, and advance buttons 27, 28, 29, 30.

As previously stated, electrical power is supplied to the electronic components of the data recorder 10 by the vehicle's battery 21. Preferably, unswitched power is provided through the standard vehicle fuse block 21a to the electronic clock 110 and date display 25, and the memory circuit 108. If desired, conventional filtering or other line-conditioning circuitry can be interposed between the battery 21 and the above-described devices. Switched power is preferably provided through the vehicle's ignition switch 20, which is preferably of the three position type now standard on most modern automobiles and trucks, to the circuitry associated with the total and advance buttons 29, 30, to the printer module 33 and paper advance mechanism, and to the computation and control circuit 109.

Alternatively, a small battery, such as a series of lithium cells having extended wear characteristics, can be used to provide unswitched power to the electronic clock 110 and date display 25, and to the memory circuit 108. This alternative has the advantage that a failure of the vehicle's battery 21 will not result in the loss of the clock setting or of the data stored in the memory circuit 108.

Prior to installing and operating the data recorder 10, the mileage setting determined by the positions of the inner drums 97a–j is initialized to correspond to the mileage reading on the vehicle's standard drum odometer. This is accomplished by turning the rigid cable 69 with an electric drill, for example. Alternatively, a patch or distribution panel having switchable input to output connectors could be provided between the outer drums 101a–j and the "1 of N" conversion circuit 107 so that the wires connecting the two could simply be rearranged to provide an initial setting. This alternative is less preferable because it requires access into the housing of the vehicular data recorder 10 and provides an opportunity for tampering therewith.

Operation of the data recorder 10 will now be described. Initially, the driver of the vehicle turns the ignition switch 20 to the "accessory" position causing power to be supplied to the circuitry associated with the driver code input keypad 23 and the driver change control key 24. If the data recorder 10 is being used for the first time, or if there has been a battery failure, or if it is desired to change the stored driver code, the driver enters the new code by first depressing the driver change control key 24 to enable the memory circuit 108 to receive data, and then entering the new code on the driver code input keypad 23. The driver may also depress the "business" or "other" key 27, 28 at this time to generate a code which is also temporarily stored in the memory circuit 108. The driver next turns the ignition switch 20 to the "start" position, it being understood that if no driver code is entered, the driver need not pause at the "accessory" position before proceeding to the "start" position. Turning the ignition switch 20 to the "start" position causes electrical power to be supplied to the printer module 33, and the paper advance mechanism, as well as to the computation and control circuit 109, which passes the signals from the "1 of N" conversion circuits 107 to the printer module 33. The printer driver circuitry converts the BCD signals from the "1 of N" conversion circuits 107 into control signals which cause the printer module 33 to print the current odometer total and trip mileage on the paper form 48. The printer module 33 also prints the date from the electronic clock 110, and the current driver code and trip purpose code from the memory circuit 108. When the printer module 33 has completed printing a line of information, it transmits a signal to the paper advance mechanism. In turn, the paper advance mechanism causes the drive roll 51 to turn and advance the paper form 48, preferably by one line.

No driver intervention is required after the ignition switch 20 is placed in the "start" position. As the vehicle proceeds, its speedometer/odometer cable 13 rotates. As previously described, this rotational motion is communicated to the rigid rod 69. From there, it is communicated through the conventional odometer gearing arrangement of the converter 96 to the first and second shafts 86, 91 and each of the inner drums 97a–j mounted on those shafts. It is understood that the inner drums 97a–d and 97e–j are interconnected respectively in a standard odometer gearing arrangement so that where rotation or motion of the drums is referred to, such rotation may in fact occur in some drums only every ten thousand miles, for example. With this in mind, as the inner drums 97a–j rotate, the respective contact elements 105 rotate correspondingly so that the tips 105a thereof sequentially electrically connect the individual conductive elements of each conductive pair on the inner faces of the respective fixed outer drums 101a–j. For example, as inner drum 97a rotates, the tip 105a electrically connects, for example, the elements of pair 102a, then 102b and so on. As previously stated, each connection produces a unique electrical signal corresponding to an odometer drum digit. Thus, at any moment, the positions of the tips 105a on the faces of inner drums 101a–j generate ten unique electrical signals representative of a four digit trip odometer and a six digit total odometer reading.

When the driver reaches his or her destination and turns the ignition switch 20 to the "off" position, power is again supplied to the printer module 33, the paper advance mechanism, and the computation and control circuit 109 through a conventional time delay switch, for example. The printer module 33 prints the new odometer mileage along with the driver code and date, then transmits a signal to the paper advance mechanism to cause the paper form 48 to advance by one line.

In addition to the automatic operation of the data recorder 10, the driver can also manually cause the data recorder 10 to total the mileage travelled and advance the paper form 48 through the opening in the bottom of the housing 22 and out so it can be detached. To total, the driver simply turns the ignition switch 20 to the "accessory" position and depresses the total button 29. When the ignition switch is in the "accessory" position, power is supplied to the printer module 33 and paper advance mechanism, and to the computation and control circuit 109. Depressing the total button 29 generates a code that causes the computation and control circuit 109 to read a stored odometer value from the memory circuit 108. The computation and control circuit 109 also receives the current odometer value from the "1 of N" conversion circuits 107. It computes the difference between the two values or the elapsed mileage, and transmits this value to the printer module 33 which prints the value on the paper form 48. As previously described, after printing the data, the printer module 33 transmits a signal to the paper advance mechanism which causes the paper for 48 to advance one line. Alternatively, at this point in time, the driver may depress the advance button 30 to cause a series of signals to be transmitted to the paper advance mechanism so that the section of the paper form 48 containing the printed data is advanced completely out of the housing 22 through the opening in the bottom previously described. It is preferred that the advance button 30 be disabled until after the total button 29 has been actuated. As previously stated, it is preferable that the total button 29 remain backlit until it has been actuated as a reminder to the driver that it must be actuated before the advance button 30 is enabled. After the computation and control circuit 109 has transmitted the data to the printer module 33, it also writes the current odometer value into the memory circuit 108 for use the next time the elapsed mileage is totalled. After the paper form 48 is advanced out of the housing 22, the driver turns the ignition switch 20 to the "off" or "start" position as he or she desires.

Of course, it is understood that the detailed description herein of a vehicular data recorder comprising a presently preferred embodiment of the present invention is merely illustrative of various aspects and features of the invention, and that it is not intended to be limiting. Various changes to the presently preferred embodiment described herein, as well as various alternative modes of operation will be apparent to those skilled in the art. For example, the position of the ignition switch which initiates the various data recorder functions can be changed. Also, data can be recorded in various formats and at different times than herein described. Many other modifications are possible. Such changes and modifications can be made without departing from the spirit and scope of the invention. It is, therefore, intended that such changes and modifications be covered by the following claims and their equivalents.

I claim:

1. An electronic data recorder for use in a vehicle having a rotatable speedometer-odometer cable for recording electrical signals representative of mileage, comprising:
    a housing;
    connecting means mounted to said housing and adapted to releasably couple a free end of said cable thereto to transmit the rotational motion of said cable into said housing;
    a plurality of rotatable parallel inner drums connected together in a geared odometer arrangement and coupled to said connecting means;
    a plurality of fixed parallel outer drums surrounding said plurality of parallel inner drums in a one to one correspondence,
    each outer drum having a plurality of electrically conductive sections, each conductive section being electrically isolated from every other section, and said plurality of conductive sections being arranged in pairs with each pair corresponding to a mileage digit;
    a plurality of electrically conductive contact elements, one element of said plurality being attached to each inner drum, and extending outwardly therefrom to contact said corresponding outer drum, so that as said inner drum rotates, said contact element electrically connects the sections of each pair to generate an electrical signal representative of a unit of mileage; and
    means for recording said electrical signals.

2. The apparatus of claim 1 further comprising:
    a plurality of electrical circuit means, each circuit means of said plurality being electrically connected to one of said pairs of conductive sections for producing a separate electrical signal when the adjacent sections of the corresponding pair are in electrical contact.

3. An electronic data recorder for use in a vehicle having a rotatable speedometer-odometer cable comprising:
    a housing;
    connecting means mounted in said housing and adapted to releasably couple an end of said cable;
    modular means, mounted in said housing and adapted to be coupled to the connecting means for converting rotational motion of said cable into a plurality of electrical signals representative of mileage;
    a continuous roll of paper stored on a rotatable shaft in said housing;
    modular printing means mounted in said housing for receiving said electrical signals representative of mileage, and for printing said mileage from said signals in readable format on said paper;
    modular paper advance means mounted in said housing responsive to signals from said printing means for advancing said paper from said roll past said printing means and thereafter out of said housing;
    said means for converting said rotational motion into a plurality of electrical signals further comprising;
    a plurality of rotatable parallel inner drums connected together in a geared odometer arrangement in said housing and adapted to be coupled to said connecting means;
    a plurality of fixed parallel outer drums surrounding said plurality of parallel inner drums in a one to one correspondence, each outer drum having a plurality of electrically conductive sections, each conductive section being electrically isolated from every other conductive section, and said plurality of conductive sections being arranged in pairs with each pair representing a mileage digit; and
    a plurality of electrically conductive contact elements, one of said contact elements attached to each said inner drum and extending outwardly therefrom to contact said corresponding outer drum so that as said inner drum rotates, said contact element sequentially electrically connects the sections of each pair of electrically conductive sections to generate an electric signal representative of mileage.

4. The electronic data recorder of claim 3, further comprising a plurality of electrical circuit means connected to said pairs of conductive sections for generating a plurality of electrical signals indicative of mileage.

* * * * *